UNITED STATES PATENT OFFICE.

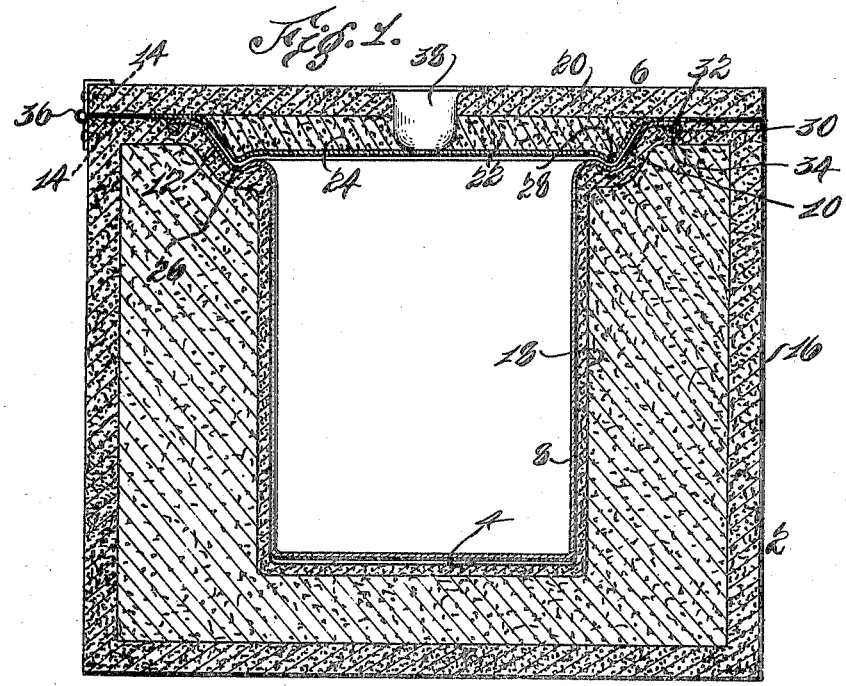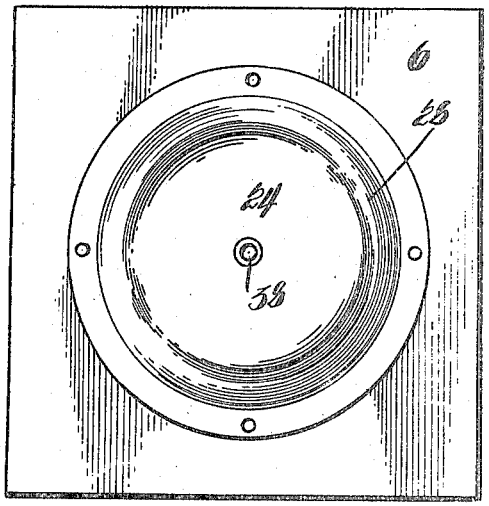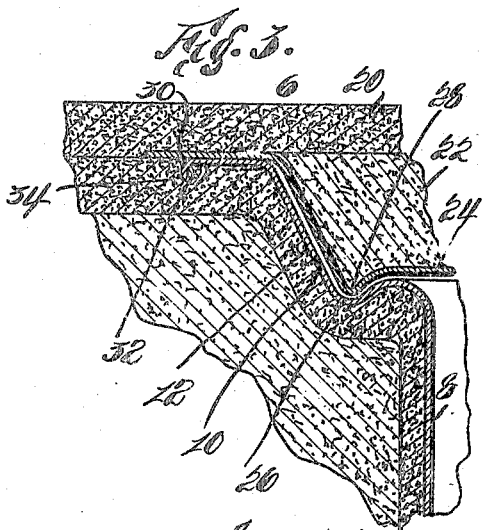

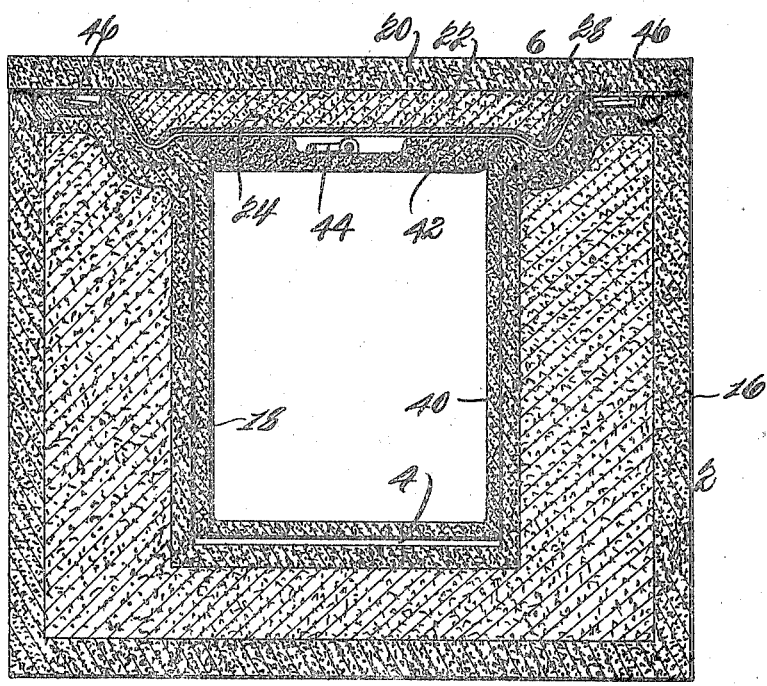

ROSER BALTHASAR SUTTER, OF NEWARK, NEW JERSEY, ASSIGNOR TO ZENITHERM COMPANY, OF NEWARK, NEW JERSEY, A CORPORATION OF NEW JERSEY.

FIRELESS COOKER.

1,283,960.  Specification of Letters Patent.  Patented Nov. 5, 1918.

Application filed October 28, 1915. Serial No. 58,347.

*To all whom it may concern:*

Be it known that I, ROSER BALTHASAR SUTTER, a citizen of the United States, residing at Newark, county of Essex, and State of New Jersey, have invented certain new and useful Improvements in Fireless Cookers, of which the following is a clear, full, and exact description.

This invention relates to structures which have compartments so insulated from the outside that inside heat is prevented from escaping to the outside or that outside heat is prevented from entering the compartments, and is herein shown as embodied in a structure of the type known as "fireless cookers". It will be understood, however, that the invention is not restricted to its illustrated embodiment or use, and that it is of general utility in the art to which it relates.

Heretofore, fireless cookers have usually comprised an outer casing of wood or metal and an inner lining of sheet metal fixed to the outer casing, the space between the lining and outer casing being filled with some loose non-conducting or heat insulating material, such as saw-dust, hay, slag, mineral wool, etc. Fireless cookers of this construction gradually lose their efficiency owing to the fact that the filling of loose material is very hygroscopic and will therefore naturally settle down and become more compact after the cooker has been in use for a time. Moreover, of the materials in common use for fillers, saw-dust and slag afford good soil for the growth of fungus and various bacteria, and mineral wool usually decomposes and forms sulfid of hydrogen with its well-known disagreeable odor. Furthermore, in manufacturing the cookers having mineral wool insulation, the fine glass splinters, usually present in this substance, penetrate the skin of the workingmen and cause bad inflammation.

A further structural defect in fireless cookers, as heretofore made, a defect that seriously affects their durability, is the difficulty of keeping the fixed linings free from moisture and other deleterious substances which accumulate upon the linings as the result of the cooking operation. Besides affecting the durability of the cookers, the decomposition of the acids and vapors condensed upon the linings soon renders them foul smelling.

A general object of the present invention is to provide an improved structure of the class described, which is particularly adaptable for use as a fireless cooker, that will be free from the objectionable features hereinabove pointed out and that, moreover, will be more efficient than constructions hitherto in use or known.

Another object of the invention is to provide an improved structure, having a compartment surrounded by heat insulating walls, in which the insulation will be substantially continuous and homogeneous, and preferably solid and rigid, and in which the lining of the compartment can readily be removed for cleaning or replacement.

More particularly the invention aims to provide a construction in which it is not necessary to carry the metal lining over the entire rim of the receptacle in order to connect the inside and outside walls, as is the case with former cookers which have loose insulating filling between the walls. In structures of the class described, it is objectionable to have metal extending from the inside to the outside wall, since the metal, because of its heat-conducting properties, tends to dissipate the heat from the interior of the cooker more quickly than if there were no such connection. In the present improvement, therefore, the rim of the removable metal lining may be entirely within the outside walls of the receptacle, thus forming no metallic communication between the inside and outside walls, and insuring greater heat-insulating qualities for the cooker.

An important feature of the invention is the construction of a continuous, substantially homogeneous, solid, heat insulating wall in such manner that the surfaces of said wall are smooth enough to receive a finish, whereas the parts of said wall between said surfaces are cellular.

Another important feature of the invention consists in the formation of a portion of a wall of substantially homogeneous heat insulating material of such density and hardness that it may be utilized for the attachment of the hardware essential to the connection of the different parts of the structure.

Other objects and important features of the invention will be apparent when the following description and claims are considered in connection with the accompanying drawings, in which—

Figure 1 is a section through a fireless cooker in which the invention is embodied;

Fig. 2 is a bottom plan view of the cover;

Fig. 3 is an enlarged sectional detail illustrating the means for sealing the compartment to prevent the escape of heat when the cover is closed; and Fig. 4 shows a modified construction in which the lining is made in such manner and of such material that it may serve as the heating element of the cooker.

The illustrated cooker comprises a body 2 having a compartment 4 and a cover 6, said compartment being provided with a removable lining, comprising a vessel 8 of sheet metal, which preferably fits closely the side walls of the compartment 4 in order to prevent the formation of convection currents of air which would carry the heat to parts of the structure in which it would not be available for cooking purposes. At the bottom, the vessel 8 is preferably spaced slightly from the bottom of the compartment 4 in order to insure a tight fitting of the peripheral flange 10 of the vessel in the seat 12 in the body 2 in which said flange rests to support the vessel and to seal the compartment and prevent the escape of heat.

The body 2 of the structure is formed preferably integral and solid of substantially homogeneous material which is molded, when in plastic condition, into the desired shape. In molding the structure to shape, different parts thereof are preferably subjected to different degrees of compression, whereby said parts are made of varying density, and in order to secure the maximum of insulating effect for a given weight of the material, and at the same time to provide a structure which will keep its shape and which can be finished to present a pleasing appearance, the portion of said body at and adjacent to its outer surface is preferably made smooth enough to receive a finish, and hard enough to hold screws, such as shown at 14, for attaching the hinges or other hardware, and also preferably hard enough to protect and to aid in maintaining the shape of the structure. Preferably, also, the inner surface, that is, the walls of the compartment, will be made smooth to prevent wear and to facilitate the insertion and removal of the lining 8. The described construction of the outer wall portion of the structure is shown at 16 on the drawing, and the described construction of the inner wall portion of the structure is shown at 18 on the drawing. Between these two more dense portions of the structure, the material, while brought into a solid condition, will preferably be left cellular in order to provide numerous isolated cavities filled with air, whereby a most effective insulation of the compartment from the outside will be obtained.

A suitable material for forming a body 2 having the described characteristics, is ground cork mixed with a liquid binder to bring it into a plastic state, whereby it may be molded into the desired shape, the cork itself having well-known heat insulating properties, and when molded in the manner above described forming a structure especially suitable for the purposes intended. In forming the exterior and interior wall portions of the structure, cork which is more finely ground than that used for the intermediate portions, will preferably be employed in order that the exposed surfaces may be made smooth enough to receive a finish, such as enamel or varnish.

The cover 6, like the body 2, preferably has a wall portion 20 of denser construction than the portion 22 between said wall and the compartment, the portion 22 of said cover having a sheet metal covering 24, preferably of material similar to that used in forming the lining 8 of the compartment. In order effectively to prevent the escape of heat from the inside of the vessel 8, the flange 10 of said vessel is preferably provided with a depression 26 which rests in a similar depression molded into the body 2, this depression serving to collect moisture, whereby in coöperation with a corresponding rib 28 upon the metal lining of the cover, it forms a water seal. In order to reinforce the edge of the flange 10 and at the same time to form a seal for preventing heat which may be conducted or carried up along the sides of the lining 8 from escaping from the cooker, this edge is preferably rolled under, as shown at 30, and provided with a reinforcing wire 32. Molded into the body 2 of the structure is a recess 34 in which the rib 30 is received, this recess 34 being shaped to fit closely the sides and bottom of the rib 30, whereby it prevents the escape of heated air which may work itself up between the lining 8 and the wall 18 of the compartment.

It will be noted that the flange 10 does not extend to the side faces of the body 2, this being the preferable construction, since, thereby, metallic connection between the inside and outside of the cooker is avoided. Such metallic connection is present in ordinary cooker constructions and is an important cause of the heat wastage and consequent inefficiency of such constructions.

The cover 6 may be attached to the body 2 in any suitable manner, as, for example, by hinges 36 connected by screws 14 hereinabove referred to. Any suitable valve 38 for permitting the escape of steam when the pressure in the vessel 18 becomes too great may be provided in the cover.

In the modified cooker construction shown in Fig. 4 of the drawings, the removable lining 40 is made of material which may serve as the heating element for the cooker so that, when said lining is removed, it may be heated over a gas flame or other heating means and thus the usual stone or other heating element employed in connection with fireless cookers may be dispensed with. In this construction the lining will preferably be provided with a cover 42, and in view of the increased weight and the necessity for handling the lining while it is hot, both the cover 42 and the lining receptacle 40 will be provided with handles 44 and 46 respectively.

By the foregoing construction, it will be seen that there is no opportunity for loss of efficiency of the cooker, due to deterioration of the insulating material, since this material is in the form of a solid, and preferably rigid, body which cannot change shape from any operations which take place in the cooker. It will further be seen that by having the insulating material which is next to the lining 8 molded into permanent shape, the lining 8 may be withdrawn from and replaced in the compartment 4 at will, thereby facilitating the cleaning of this lining after each cooking operation.

What I claim as new is:—

1. In a structure having a heat insulated compartment, walls for said compartment formed of granulated cork united in a permanently shaped porous mass by a suitable binder, the size of the granules and the interstices therebetween varying from the inner to the outer surfaces of said walls.

2. In a structure having a heat insulated compartment, walls for said compartment formed of granulated cork united in a permanently shaped self-sustaining porous mass by a suitable binder, the granules at the surface of said wall being small and closely compacted, and the granules between said surfaces being arranged to form a cellular structure.

3. In a structure having a heat insulated compartment, walls for said compartment formed of granulated cork united in a permanently shaped self-sustaining porous mass by a suitable binder, the cork granules being more closely compacted and pressed together at the surface of said walls than at the interior thereof.

4. In a structure having a heat insulated compartment, walls for said compartment formed of granulated cork united in a permanently shaped self-sustaining porous mass by a suitable binder, the cork granules being more closely compacted and pressed together from the interior of said walls to the surfaces thereof, in combination with a removable lining of smooth impervious material closely fitting the side walls of said compartment and having a supporting flange projecting over and resting loosely upon the upper faces of the side walls of said compartment but terminating a substantial distance from the outer edges of said walls.

5. In a structure having a heat insulated compartment, walls for said compartment formed of granulated cork united in a permanently shaped self-sustaining porous mass by a suitable binder, the cork granules being of decreasing size and more closely compacted and pressed together from the interior of said walls to the surfaces thereof, in combination with a removable lining of smooth impervious material closely fitting the side walls of said compartment and having a supporting flange projecting over and resting loosely upon the upper faces of the side walls of said compartment but terminating a substantial distance from the outer edges of said walls, said flange being provided with a sealing rib and said walls having a groove in which said rib is received, the proportions of the parts being such that the bottom of the lining is spaced from the bottom of said compartment, whereby the weight of the lining and its contents tends to force said rib into said groove.

Signed at New York, N. Y., this 21st day of October, 1915.

ROSER BALTHASAR SUTTER.

Witnesses:
 BEATRICE MIRVIS,
 CHAS. CLARK.

Copies of this patent may be obtained for five cents each, by addressing the "Commissioner of Patents, Washington, D. C."